(12) United States Patent  (10) Patent No.: US 8,799,956 B2
Taxier  (45) Date of Patent: Aug. 5, 2014

(54) EPG CONTENT TREE

(75) Inventor: Karen Taxier, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 532 days.

(21) Appl. No.: 13/097,040

(22) Filed: Apr. 28, 2011

(65) Prior Publication Data

US 2012/0278838 A1  Nov. 1, 2012

(51) Int. Cl.
*H04N 5/445* (2011.01)
*G06F 3/00* (2006.01)

(52) U.S. Cl.
USPC .................. 725/49; 725/45; 725/52

(58) Field of Classification Search
CPC .......................... H04N 21/482; H04N 21/4312
USPC .......................... 725/37–40, 44, 45, 47, 52, 61
See application file for complete search history.

(56) References Cited

U.S. PATENT DOCUMENTS

| 5,751,372 | A  | * | 5/1998 | Forson ............................. 725/49 |
| 6,757,906 | B1 | * | 6/2004 | Look et al. ...................... 725/45 |
| 6,931,604 | B2 | * | 8/2005 | Lane .............................. 715/853 |
| 2010/0071000 | A1 | * | 3/2010 | Amento et al. ................. 725/39 |

OTHER PUBLICATIONS

Thinkmap Visual Thesaurus—An online thesaurus and dictionary of over 145,000 words, http://www.visualthesaurus.com, accessed May 31, 2011, known at least as early as Apr. 28, 2011, 3 pages.
Visual Thesaurus report for the word "inevitably," http//www.visualthesaurus.com, known at least as early as Apr. 28, 2011, 2 pages.

* cited by examiner

*Primary Examiner* — Benjamin R Bruckart
*Assistant Examiner* — Jason Thomas
(74) *Attorney, Agent, or Firm* — Seed IP Law Group PLLC

(57) ABSTRACT

Disclosure is generally directed to outputting an electronic programming guide (EPG) content tree from a television receiver for display on an output device. A content tree consistent with this disclosure may include a number of interconnected nodes that present programming content that is available for viewing or recording through the operation of the television receiver.

18 Claims, 8 Drawing Sheets

EPG CONTENT TREE

TECHNICAL FIELD

Embodiments discussed herein are generally directed to display a content tree that includes a number of interconnected nodes that present programming content available for viewing or recording through the operation of the television receiver.

BACKGROUND

Cable television, satellite television, and other providers of program services typically include functionality for display of programming guide information in their services. Programming guide information may be viewed through an "electronic programming guide" (EPG) menu that is enabled by a user through input to a receiver sent through an input device such as a remote control. The electronic programming guide data typically includes program schedules, having such information as program channels and times in which various programs may be viewed on a particular channel. An EPG guide may be output in graphical form by way of a grid having channels corresponding to rows and time slots in the various columns of the grid. Once a user commands a receiver to display EPG guide information, the requested information may be displayed as an overlay or otherwise over a portion of a display that is used to view a channel or other visual content from a broadcast service.

In many cases, an EPG menu presents a great deal of information that a user scrolls through when a making viewing selection. The channel information may, in some cases, be presented in ways that distract the user or that prevent the user from making a quick and efficient choice. For example, the volume of information provided may overwhelm the user and he or she will exit the EPG without fully appreciating the available programming options. Accordingly, it may be desirable to have an EPG that presents programming information in an efficient and concise manner.

SUMMARY

Embodiments discussed herein are generally directed to outputting an electronic programming guide (EPG) content tree from a television receiver for display on an output device. A content tree consistent with this disclosure may include a number of interconnected nodes including a time node and a number of program nodes. The time node indicates the current time or a future time and is connected to the program nodes. The program nodes indicate a category of programming for which there are programs available at the time indicated by the time node. A program node may additionally be connected to a number of sub-nodes that provide a further categorization of the programs indicated by the program node. The size of the program node or program sub-node may be proportional to an amount of programs available at the time indicated by the time node. The display of the content tree may be focused on a particular node or sub-node and that focus may shift in response to user input that maneuvers through the content tree. In response to a user selection of a particular program node or sub-node, a navigable listing of programs indicated by the node or sub-node may be displayed. In response to a user selection of a listed program, the television receiver may be tuned to a channel that carries the selected program or a recorder be set to record the selected program.

In various aspects, the present disclosure relates to an electronic programming guide method, comprising: outputting a first signal from a television receiver to an output device, the television receiver configured to receive a program service transmission from a service provider; the first signal causing the output device to display a first content node, the first content node connected to one or more first linked nodes, receiving a directional input at the television receiver, the directional input indicating a particular one of the first linked nodes; in response to the directional input, outputting a second signal from the television receiver to the output device; and the second signal causing the output device to display a second content node, the second content node connected to one or more second linked nodes, wherein the second content node is the particular first linked node indicated by the directional input, and the first content node is one of the second linked nodes.

In some embodiments, the method further comprises: placing a visual focus on the first content node by orienting the first content node in a substantially central location on the output device.

In some embodiments, the method further comprises: placing a visual focus on the first content node by highlighting the first content node with a color that contrasts with other colors that are displayed by the output device.

In some embodiments, the first content node is a time node that indicates a time of day; the one or more first linked nodes are program nodes, the particular one of the first linked nodes indicates a first category of programs available for viewing at a time of day indicated by the time node.

In some embodiments, the method further comprises: a plurality of program sub-nodes, each program sub-node connected to the second content node; receiving a second directional input at the television receiver, the second directional input indicating a first program sub-node, the first program sub-node indicating a first subcategory of programs available for viewing at the time of day indicated by the time node, the first subcategory of programs being a subset of the programs in the first category of programs; and in response to the second directional input, placing a visual focus the first program sub-node.

In some embodiments, the method further comprises: receiving a node-selection input at the television receiver, the node-selection input indicating a selection of the node that is currently in the visual focus; and in response to the node-selection input, modifying the third signal such that a list of all programs in the first category of programs is displayed.

In some embodiments, the method further comprises: modifying the third signal such that the visual focus shifts from the first program node to a first program in the list of all programs in the first category of programs; modifying the third signal such that the first program node is displayed in a peripheral location on the output device; and modifying the third signal such that none of the other nodes in the electronic programming guide tree are displayed on the output device.

In some embodiments, the method further comprises: modifying the third signal such that the output device displays an extended information window, the extended information window including information for the first program.

In some embodiments, the method further comprises: receiving a program-selection input at the television receiver; and in response to the program-selection input, tuning the television receiver to a channel that carries the first program.

In various aspects, the present disclosure relates to an electronic programming guide method, comprising: outputting a signal from a television receiver to an output device, the television receiver configured to receive a program service transmission from a service provider; the signal causing the output device to display a time node portion of an electronic programming guide tree, the time node indicating a time of day; and the signal causing the output device to display a plurality of program nodes for the electronic programming guide tree, each program node connected to the time node, the plurality of program nodes including at least a first program node indicating a first category of programs available for viewing at the time of day indicated by the time node; wherein each program node has a size, the size of at least the first program node being proportional to an amount of programs that are in the first category and are available for viewing at the time of day indicated by the time node.

In some embodiments, if the television receiver has not received a time selection input, the time node indicates the current time of day.

In some embodiments, the time node indicates the current time of day, the method further comprising: receiving an indication that the current time of day coincides with the end of a first time period and the beginning of a second time period; determining that the amount of programs in the first category and available for viewing in the first time period differs from the amount of programs in the first category and available for viewing in the second time period; and in response, modifying the signal such that the size of the first program node is changed to be proportional to the amount of programs that are in the first category and available for viewing in the second time period.

In some embodiments, the electronic programming guide method further comprises: receiving a time-selection input at the television receiver, the time-selection input selecting a time of day, the time of day selected by the time-selection input differing from the time of day indicated by the time node; and in response to the time-selection input, modifying the signal such that the time node indicates the time of day selected by the time-selection input.

In some embodiments, the electronic programming guide method further comprises: in response to the time-selection input, modifying the signal such that the size of the first program node is proportional to an amount of programs that are in the first category and are available for viewing at the time of day indicated by the time-selection input.

In some embodiments, the electronic programming guide method further comprises: receiving a node-selection input at the television receiver, the node-selection input selecting the first program node; and in response to the node-selection input, displaying a list of all programs in the first category of programs.

In some embodiments, the electronic programming guide method further comprises: receiving a program-selection input at the television receiver; and in response to the program-selection input, setting a timer at the television receiver to record the program indicated by the program selection input.

In various aspects, the present disclosure relates to a television receiver, comprising: a tuner operable to receive a program service transmission from a service provider, the program service transmission having a plurality of channels, the tuner operable to select one of the channels and to process the channel to be output in a video signal to an output device; a memory connected to the tuner, the memory having a tangible storage medium operable to store computer readable instructions and data including electronic programming guide data received from the service provider; a processor connected to the memory and operable to run computer executable code stored in the memory; a display module comprising computer readable instructions stored in the memory, the display module configured to execute on the processor to processes the electronic programming guide data and to output at least a portion of the electronic programming guide data in a data signal to the output device, the data signal causing the output device to display a programming guide tree having at least a time node and a first program node connected to the time node; and the first program node indicating a programming category, the first program node being associated with one or more programs that belong to the programming category and that are available for viewing at a time of day indicated by the time node.

In some embodiments, the first program node has a size, the size of the first program node being proportional to an amount of programs that are in the programming category and that are available for viewing at the time of day indicated by the time node.

In some embodiments, the television receiver further comprises: a signal receiver configured to receive commands from a user input device, the commands including: a directional command instructing the display module to shift a focus of the electronic programming guide tree from a first node that is currently the focus of the electronic programming guide tree to a second node that is adjacent to the first node; a node-selection command instructing the display module to display programs that are associated with a node that is currently the focus of the electronic programming guide tree; and a program-selection command instructing the tuner to select and process a channel that carries a program that is currently the focus of the electronic programming guide tree.

In some embodiments, the commands additionally include a time-selection command instructing the display module to output an electronic programming guide tree for a time period indicated by the time-selection command, the television receiver further comprising: a recorder configured to record and store programs received by the tuner from the service provider; wherein if the display module outputs an electronic programming guide tree for a future time, the program-selection command causes the recorder to set a timer to record the program that is currently the focus of the electronic programming guide tree.

DETAILED DESCRIPTION

Figure 1:
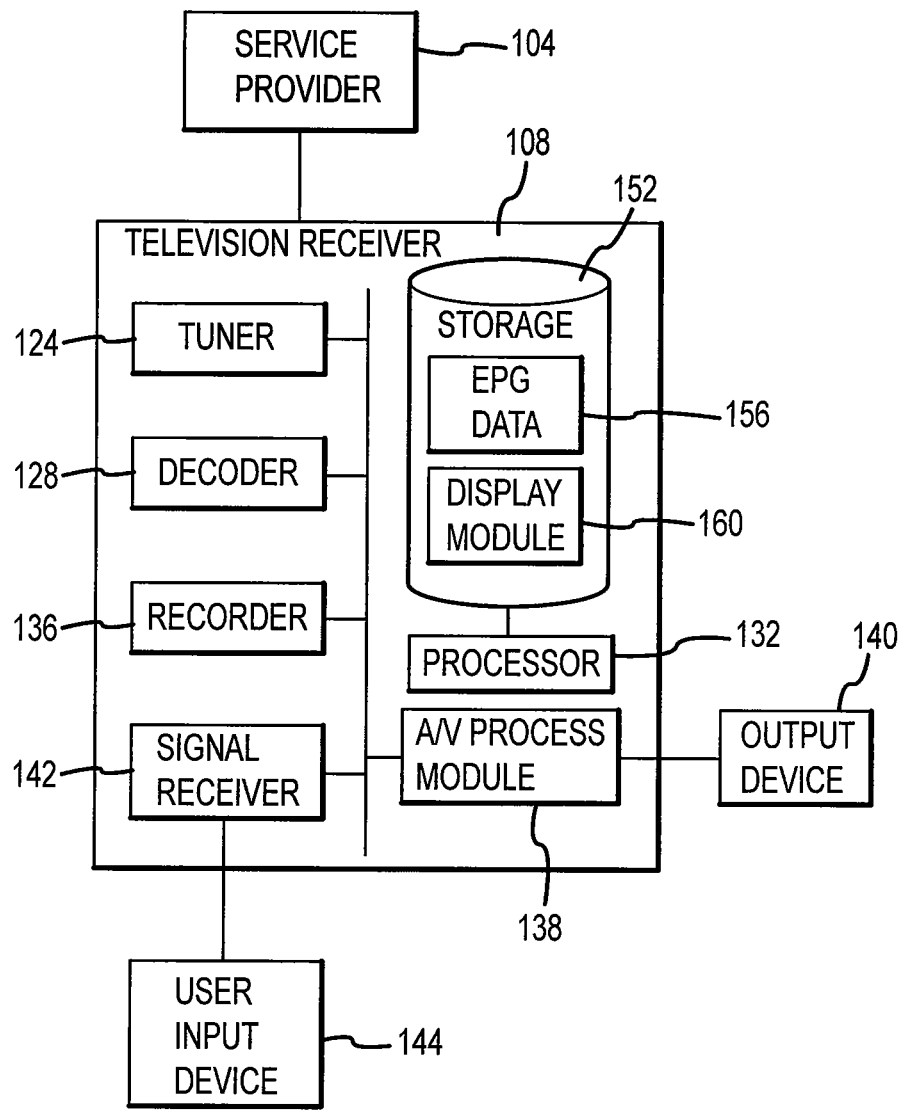
FIG. 1 is a schematic diagram showing a sample system, components and implementations discussed herein.

FIG. 1 is a schematic illustration of a general operating environment showing components and features of embodiments discussed herein. FIG. 1 includes a television receiver, generally identified by reference numeral 108. The television receiver 108 provides output signals to a display device 140, such as a television or monitor in order to display content to a user. In accordance with embodiments discussed herein the television receiver 108 may output an electronic programming guide (EPG) content tree for display on the output device 140. A content tree consistent with this disclosure may include a number of interconnected nodes that present programming content that is available for viewing or recording through the operation of the television receiver 108.

The receiver 108 depicted in FIG. 1 may be configured to communicate with or receive signals from a service provider 104 that broadcasts, transmits, or otherwise delivers a content service to a receiver 108. The receiver 108 can include a set-top box (STB), a digital video recorder (DVR), a cable receiver, a general purpose computing device, and so on. The receiver 108 may also include a cable modem that receives streaming video and/or audio. Generally, a "receiver" may be any device capable of receiving video and/or audio content included in a broadcast or other content service transmission from a service provider 104.

The receiver 108 may be associated with an individual, business or other entity, user or subscriber that receives a content service transmission from the service provider 104. Generally the terms "user" and/or "subscriber" refer to an individual or company who receives a content service transmission. This may include those who have purchased a subscription to the content service transmission. Alternatively or additionally, the terms "user" and/or "subscriber" may refer to individuals who have been given access to the content service transmission through promotional offers and/or other non-fee-based agreements.

As used herein, a "service provider" may include any service that provides a content transmission to a receiver 108 such as, without limitation, a satellite television service, a direct television service or a cable television service, or a streaming video delivered across a network such as the Internet. Accordingly, a "content service transmission" encompasses transmission of information across a cable network (for example from a cable headend to a cable receiver), an Internet or other computer-accessible medium (including a local area network, wide-area network, and so on), including Internet protocol television transmissions, a wireless network such as a radio frequency or infrared network, and so on.

In connection with embodiments that operate in the context of a satellite television service, the service provider 104 may provide a content service transmission through an uplink center. Such a satellite television service may utilize a direct broadcast satellite (DBS) system, which can incorporate packetized transmission signals according to an appropriate standard, such as the MPEG-2 and/or MPEG-4 standards. The uplink center may include a transmitter or other equipment operable to transmit a modulated signal having data representing audio and/or visual content. The modulated signal may be received at a satellite, which in turn retransmits the modulated signal to be received at one or more terrestrial locations. The retransmitted signal may be received from the satellite at one or more satellite dishes, which are typically associated with one or more receivers 108. In connection with embodiments that operate in the context of a cable television service, the service provider 104 may provide a content service transmission to a headend, which, in turn, delivers the content service transmission to the receiver 108.

The receiver 108 may include a tuner 124 operable to receive the content service transmission signal from the service provider 104 and a decoder 128 to decode the received signal. The decoder 128 may be programmed to decrypt, demodulate, demultiplex or otherwise decode some or all of the received signals in accordance with purchases and selections made by a user. Output from the decoder 128 may be directed to an audio visual (A/V) processing module 138 or other signal output portion, which may process the video and audio streams using digital-to-analog conversion techniques, or compressed digital to uncompressed digital conversion techniques, to produce one or more output signals. The output signals may be sent to a display device 140, such as a television or monitor in order to display content to a user.

The receiver 108 may include or be associated with a recorder 136, such as a digital video recorder (DVR). The recorder 136 may be integrated into the receiver 108 or may be a stand alone device. The recorder 136 may be operated by a user who programs the device or receiver function to record a particular program at a specified time. When the program occurs, the recorder 136 will record and store the program, which can then be viewed later. In addition to this functionality, the recorder 136 may buffer a certain amount of content during a live transmission. Buffering a live transmission allows a user to pause and/or rewind the content of the transmission and to then display the content in a non-live or delayed manner.

The receiver 108 may include or be associated with a memory or other storage device 152, such as magnetic or optical storage. The storage device 152 may be operable to store data received from the decoded content transmission signal. The storage device 152 may be volatile or non-volatile memory implemented using any suitable technique or technology such as, for example, random access memory (RAM), disk storage, flash memory, solid state and so on. The storage device 152 may be located within the receiver 108 or separately from the receiver 108. The storage device 152 may removable. The stored data set may include audio and/or visual content to be transmitted and output through a display device, such as a television or monitor. Generally, audio/visual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video.

The receiver 108 may additionally include a processor 132 operable to run executable code in connection with various functions associated with the receiver 108. For example, the processor 132 may display graphics, images, animations or other content through an output device, such as a television or monitor. The storage device 152 may store an application, file, or other data that is useable by the processor 132. As used herein, an application includes processor executable code that may be run to carry out one or more functions associated with the receiver 108. "Processor executable code" includes any computer-readable media or commands that may be ultimately interpreted by a processor, such as HTML or XML files that are rendered into user-viewable applications by an application executed by the processor 132.

Among other functions, the processor 132 may also receive, store and/or display an Electronic Program Guide (EPG), which may provide a schedule of program content and/or other features. As used herein, the terms "electronic programming guide" or "EPG" are intended to encompass an interface that includes a schedule of programming content provided to a user as part of a program service transmission system. The EPG may comprise a database or may otherwise access a database containing information including, for example, names or titles of viewing events (programs), corresponding channel numbers and names, brief descriptions of the programs, start and finish times, and rating and content information related to the events. The EPG data 156 may complied at the service provider 104 and transmitted to the receiver 108. The stored EPG data 156 may be accessed and provided to the user in a formatted graphic output on the display 140. The formatted graphic output may include a button, timer or other mechanism configured to cause a program to be recorded.

The processor 132 may also perform such tasks as executing commands received from a user. User commands may be sent to the receiver 108 through a user input device 144 such as remote or other wireless device. As used herein, a "user input device" may include any device operable to receive input from a user and to convey the input to the receiver 108. In one embodiment, the user input device 144 may be a hand-held device having a number of buttons or keys that when actuated by a user cause the user input device to covey information to the receiver 108 using a suitable communication means, such as an infrared signal. The user input device 144 may include a pointing device or functionality that allows the user to control the position of a cursor that is displayed on an output device. For example, the user input device 144 may include a track ball or glide plane that may be manipulated to control cursor movements. The user input device 144 may include a motion sensor or accelerometer that allows a user to control displayed items or graphics, such as a cursor, through movements of his or her hand or arm that cause a displacement of the user input device 144. It should be appreciated that other input devices such as a computer mouse or touch screen may be used and other communication means, wired or wireless, may be used. Information sent to the receiver 108 may include, for example, a command to change the output channel. Commands sent to the receiver 108 may be entered through a dedicated display menu.

The storage device 152 may store units of processor executable code in the form of one or more modules configured to implement certain functions described herein. Embodiments discussed herein are directed to outputting an EPG content tree from a television receiver 108 for display on an output device 140. In connection with outputting the content tree, the storage device 152 may include a display module 160 that is configured to format or construct an output signal based on the EPG data 156 stored in the storage device 152. The output signal may be configured to cause the output device 140 to display a content tree as described herein.

Figure 2:
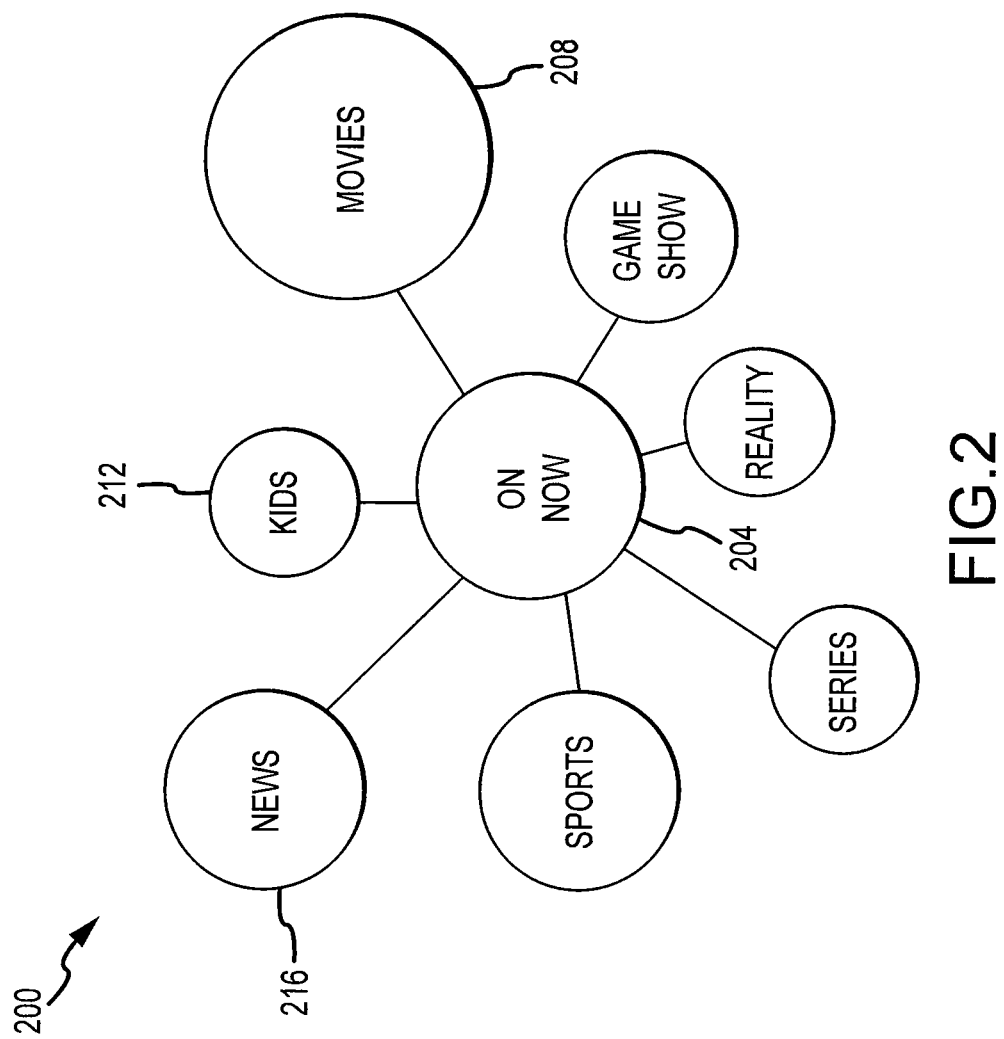
FIG. 2 is an electronic programming tree displayed on the output device illustrated in FIG. 1.

FIG. 2 is an illustration of an example EPG content tree 200 output by the display module 160. The EPG content tree 200 may be displayed on the output device 140 shown in FIG. 1. The EPG content tree 200 includes a number of inner-connected content nodes. In some instances, a content node provides a graphical or visual representation of a particular time. In other instances, a content node provides a graphical or visual representation of programming content that is available for viewing at a particular time. The EPG content tree 200 includes a time node 204. The time node 204 displays an indication of a particular time of day, as shown in FIG. 2. The time node 204 may include text such as "on now" indicating that the EPG content tree 200 displays information for programming that is available at the current time. As an alternative to text, the time node 204 may include an indication of a time of day such as "2:00 p.m.," "3:00 p.m.," and so on.

The EPG content tree 200 additionally includes a number of programming nodes, each connected to the time node 204. Among other program nodes, the EPG content tree 200 shown in FIG. 2 includes a "movies" program node 208, a "kids" program node 212, and a "news" program node 216. Each program node represents a particular category of programming. The size of the program node may be proportional to an amount of programs available for viewing in the category associated with the program node. The time node 204 and a program node 208 are related in the sense that the size of the program node is proportional to an amount of programs available for viewing at the time indicated by the time node 204. For example, the EPG content tree 200 shown in FIG. 2 includes a relatively large "movies" program node 208. That is, the "movies" program node 208 is larger in comparison to the other programming nodes which form part of the EPG content tree 200. By sizing the program nodes in this way the EPG content tree 200 gives the user a visual indication of the type of programming available for viewing at the time indicated by the time node 204. For example, an inspection of the EPG content tree 200 shows that, currently, more movies are available for viewing than are programs dedicated to children's programming.

Figure 3:
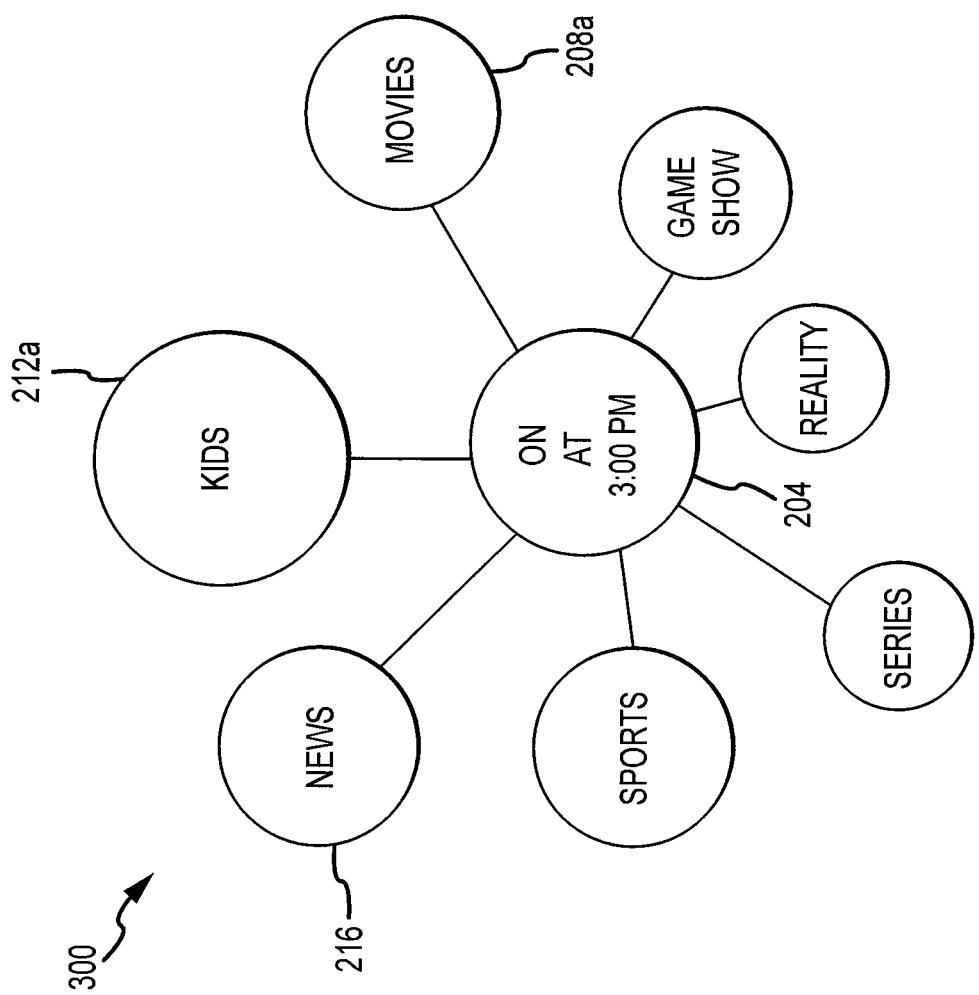
FIG. 3 is another electronic programming tree displayed on the output device illustrated in FIG. 1.

In one embodiment, the EPG content tree 200 defaults to the current time in absence of any particular input from the user. Specifically, when the EPG content tree 200 is first accessed, the visual depiction is that of the currently available programming. In accordance with certain embodiments, the user may be able to view an EPG content tree for programming scheduled to air at a later date. By way of example, FIG. 3 shows an EPG content tree 300 that may be displayed in response to a user's time selection input. Specifically, the EPG content tree 300 may be displayed in response to a user request to view programming content available at 3:00 p.m. Here, the EPG content tree 300 includes a time node 204 indicating 3:00 p.m. The size of the programming nodes are changed in the EPG content tree 300 to reflect the programming content available at 3:00 p.m. By way of example, the "movies" program node 208 is decreased in size to reflect the fact that at 3:00 p.m. fewer movies are available. Similarly, the "kids" program node 212 is increased in size to reflect the fact that at 3:00 p.m. a greater number of children's programs are available for viewing.

The change in the program node sizes reflected in FIG. 3 is by way of example and not limitation. In certain embodiments, the size of the programming nodes may be adjusted, not in response to user input, but rather to reflect the passage of time. For example, the EPG content tree 200 shown in FIG. 2 indicates that the currently available programming is depicted. If the EPG content tree 200 is displayed as the current time passes from one time period to the next, the size of the programming nodes may be updated accordingly. For example, programming content available from 1:00 p.m. to 2:00 p.m. may differ from programming content available from 2:00 p.m. to 3:00 p.m. Accordingly, if the EPG content tree 200 is displayed as the current time reaches 2:00 p.m., the EPG content tree 200 may be updated to reflect programming that is now currently available.

A particular EPG content tree 200 may be displayed in a manner that focuses the viewer's attention on a particular node. The node that is in focus may be placed or displayed in a central or substantially central location on the output device 140. In this regard, the other nodes that are linked to the node that is in the central location are displayed in off-center locations. In other embodiments, focus may be placed on a node by highlighting with a color that contrasts with surrounding colors displayed in the EPG content tree 200. These highlighting methods are by way of example and not limitation. Other methods or mechanisms for highlighting a particular node may be used in accordance with embodiments described herein. As shown in FIG. 2, the time node 204 is currently in focus. Specifically, the time node 204 is placed in a substantially central location, whereas the program nodes, such as "movies" program node 208, are displayed in an off-center location.

Figure 4:
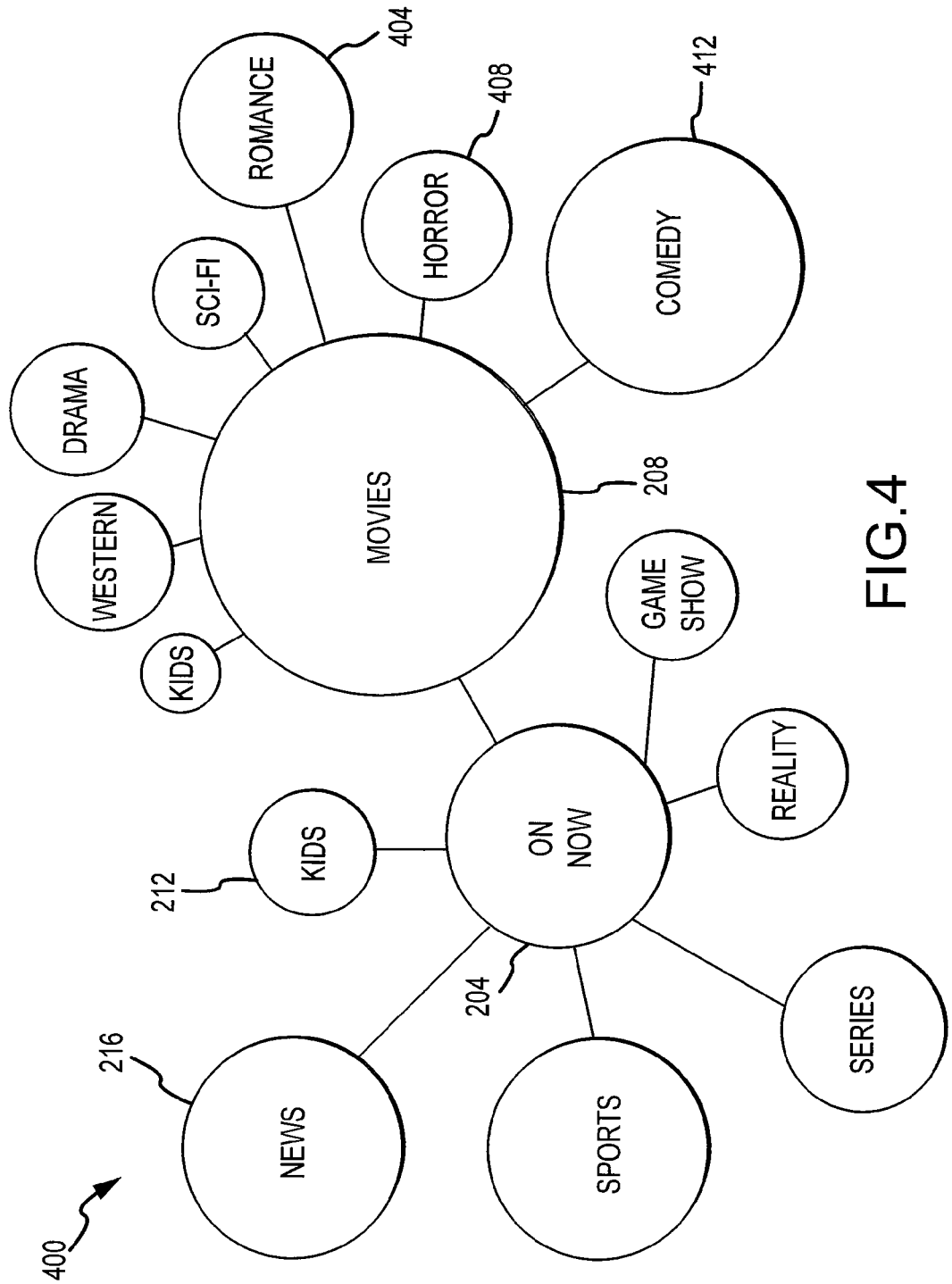
FIG. 4 is another electronic programming tree displayed on the output device illustrated in FIG. 1.

The user may navigate through the EPG content tree 200 by entering commands into the user input device 144. In response to directional inputs, the focus of the EPG content tree 200 may shift to reflect selections made by way of the directional inputs. For example, FIG. 4 shows an EPG content tree 400 that is shifted to focus on the "movies" program node 208. As shown in FIG. 4, the time node 204 and the other program nodes connected to the time node 204 are shifted to a substantially off-center location in the output device 140. Moreover, the "movies" program node 208 includes a darker outline reflecting an added emphasis.

When the focus is on a program node, such as is shown in FIG. 4, the program node that is in focus may be shown in connection with a number of sub-nodes. Each sub-node may include a subcategory associated with the category shown by the program node 208. By way of example, FIG. 4 includes, among other sub-nodes, a "romance" sub-node 404, a "horror" sub-node 408, a "comedy" sub-node 412, and so on. The sub-nodes represent a further division of the categorization indicated by the program node to which the sub-nodes are connected. As may by the case with other sub-nodes, the size of the "comedy" sub-node 412 may be proportional to the number of programs available in the displayed category. Here, the programs represented by the "comedy" sub-node 412 represent a subset of the total number of programs represented by the "movies" program node 208 to which the "comedy" sub-node 412 is connected. In the EPG content tree 400 shown in FIG. 4, the comedy sub-node 412 is relatively larger than the other sub-nodes connected to the "movies" program node 208. Accordingly, a higher percentage of comedies are available as compared to other movie genres.

Figure 5:
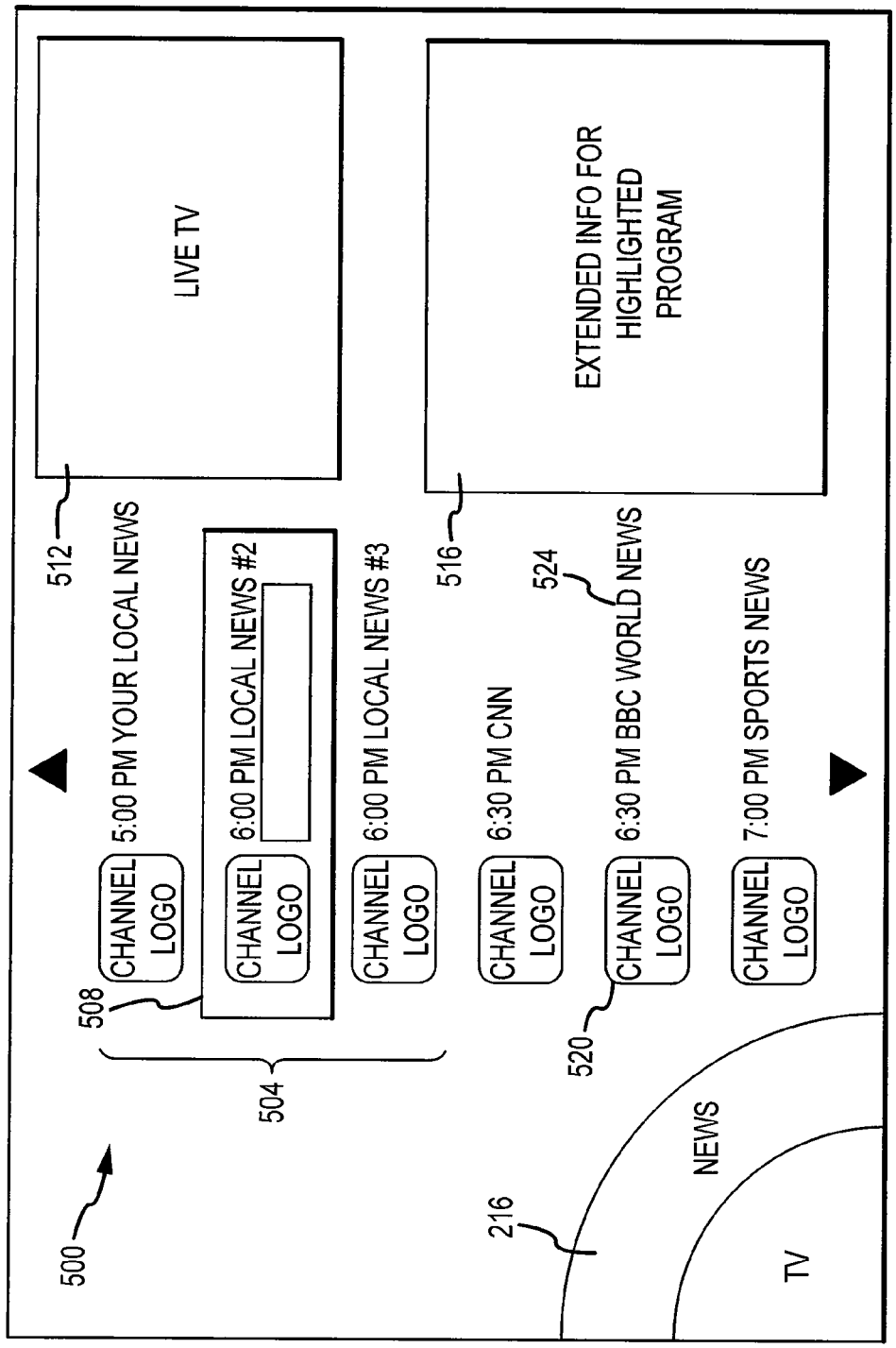
FIG. 5 is program menu displayed on the output device illustrated in the FIG. 1.

As indicated above, a user may navigate through an EPG content tree 200 by entering directional input into the user input device 144. Additionally, a user may select a particular node in order to access a list of programs that are represented by the particular node. By way of example, FIG. 5 shows a display menu 500 that may be shown in response to a user selection of a particular program node. The display menu 500 may include a listing 504 of currently available programs in the "news" category. The listing 504 may be displayed in response to a user navigating through the EPG content tree 200 to reach the news program node 216 and, following this, selecting the "news" programming node 216. As shown in FIG. 5, the listing 500 may include a plurality of news channels that may be viewed at the current time. By way of example, "BBC World News", "CNN", "local news number 3", and other news programs are available at the current time. The listing 500 may include a highlight 508 or other focus that emphasizes a particular news channel. As shown in FIG. 5, the highlight 508 is placed on "local news number 2."

The EPG display 500 may additionally include an extended information window 516. The extended information window 516 may show or list detailed information for the channel or program that is emphasized by the highlight 508. As shown in FIG. 5, the extended information window 516 shows detailed information for "local news channel number 2." In accordance with embodiments discussed herein, the user may navigate through the program listing 504 through directional input entered through the user input device 144. As shown in FIG. 5, this may include pressing up and/or down keys and, in response, the system may change the highlight or move the highlight such that an adjacent program listing is highlighted. As the highlight moves through the listing 504, the extended program menu 516 may change to reflect extended programming information for the currently highlighted program.

The display menu 500 may additionally include a live TV window 512. The live TV window 512 may display programming content that is currently shown on the channel to which the receiver 108 is currently tuned. The live TV window 512 may be a scaled or reduced version of normal or otherwise currently available programming. The display menu 500 may additionally include a portion of the EPG content tree that was previously displayed on the output device 140. By way of example, FIG. 5 includes a portion of the "news" program node 216. Here, the "news" program node 216 is displayed in a peripheral location such as a corer of the output device 140. The program list 504 may be emphasized or otherwise placed in a central location to which the user's attention may be drawn. In certain embodiments, only the selected program node is displayed in the peripheral location and the remainder of the EPG content tree is not displayed.

Figure 6:
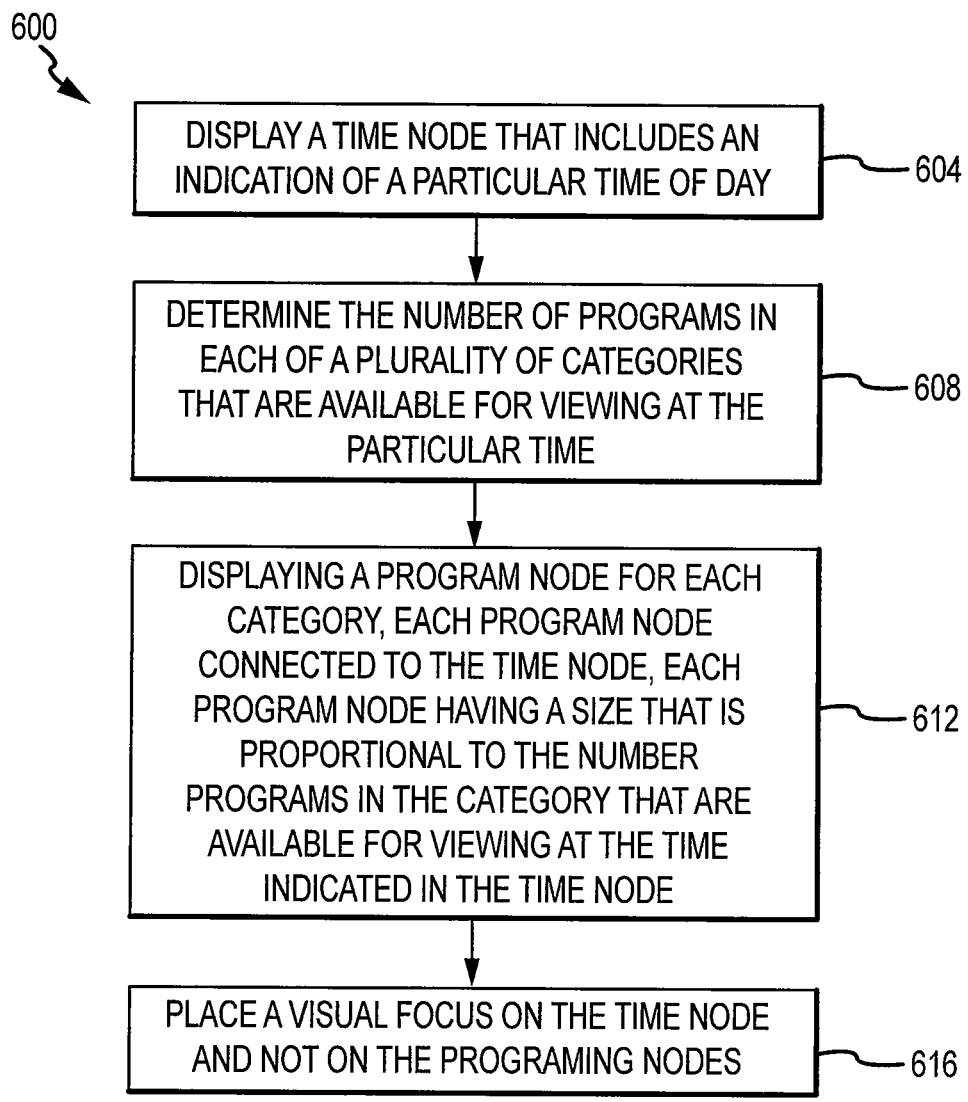
FIG. 6 is a flow chart that illustrates a method executed by the television receiver illustrated in FIG. 1.

FIG. 6 is a flowchart illustrating a method of displaying an electronic programming guide tree in accordance with embodiments discussed herein. The flowchart 600 illustrates an operation of the display module 160. Initially, in operation 604, the display module 160 displays a time node. The displayed time node is a portion of an EPG content tree. The time node may include an indication of a time of day for which the EPG content tree represents available programming content. The time node may be the current time of day or times of day that are selected by user input. Following operation 604, operation 608 may be executed.

In operation 608, the display module 160 may determine an amount of programs that are in each of a plurality of program categories. Operation 608 may include referencing and analyzing EPG data 156 received from the service provider 104 and stored in the storage device 152. The display module 160 may assign each of the programs available at a particular time to one of a number of different program categories based on metadata that describes programming content. Following operation 608, operation 612 may be executed.

In operation 612, the display module 160 displays a plurality of program nodes on the output device 140. In operation 612, the program nodes are displayed such that they include a connection to the time node. The connection to the time node may be indicated by a linear or curvilinear line segment that extends between the displayed time node and the displayed program node. Each program node displayed in operation 612 has a size. The size of the program node may be proportional to an amount of programs in the program node's category that are available for viewing at the time indicated by the displayed time node.

Following operation 612, operation 616 may be executed. In operation 616, the display module may place a focus on the time node and not on the program nodes. Shifting the focus of the displayed EPG content tree may include moving the adjacent node into a substantially central location on the output device 140. In addition to moving to a central location, the user-selected node may be highlighted with a particular color, outline or pattern such that the user's attention is drawn to the node. The focus established in operation 612 may be an initial state that is accessed by the user's initial command to view the EPG content tree 200. Specifically, in an initial state, the displayed time node is in focus, whereas the particular program nodes are not in focus.

The operations depicted in FIG. 6 are for illustrative purposes and should not be intended to define a necessary order in which the operations take place in a particular system. The order of the operations may be rearranged consistent with the embodiments described herein. The content of the display device 144 that results from the operations depicted in FIG. 6 may be maintained a signal that is output from the receiver 108 on a continuing basis as the user observes the EPG content tree 200. As the user navigates through the EPG content tree or as the user selects particular time values or time passes, the EPG content tree may be updated accordingly. Operations of the display module 160 in connection with maintaining or updating an EPG content tree are illustrated in the flowcharts shown in FIGS. 7 and 8.

Figure 7:
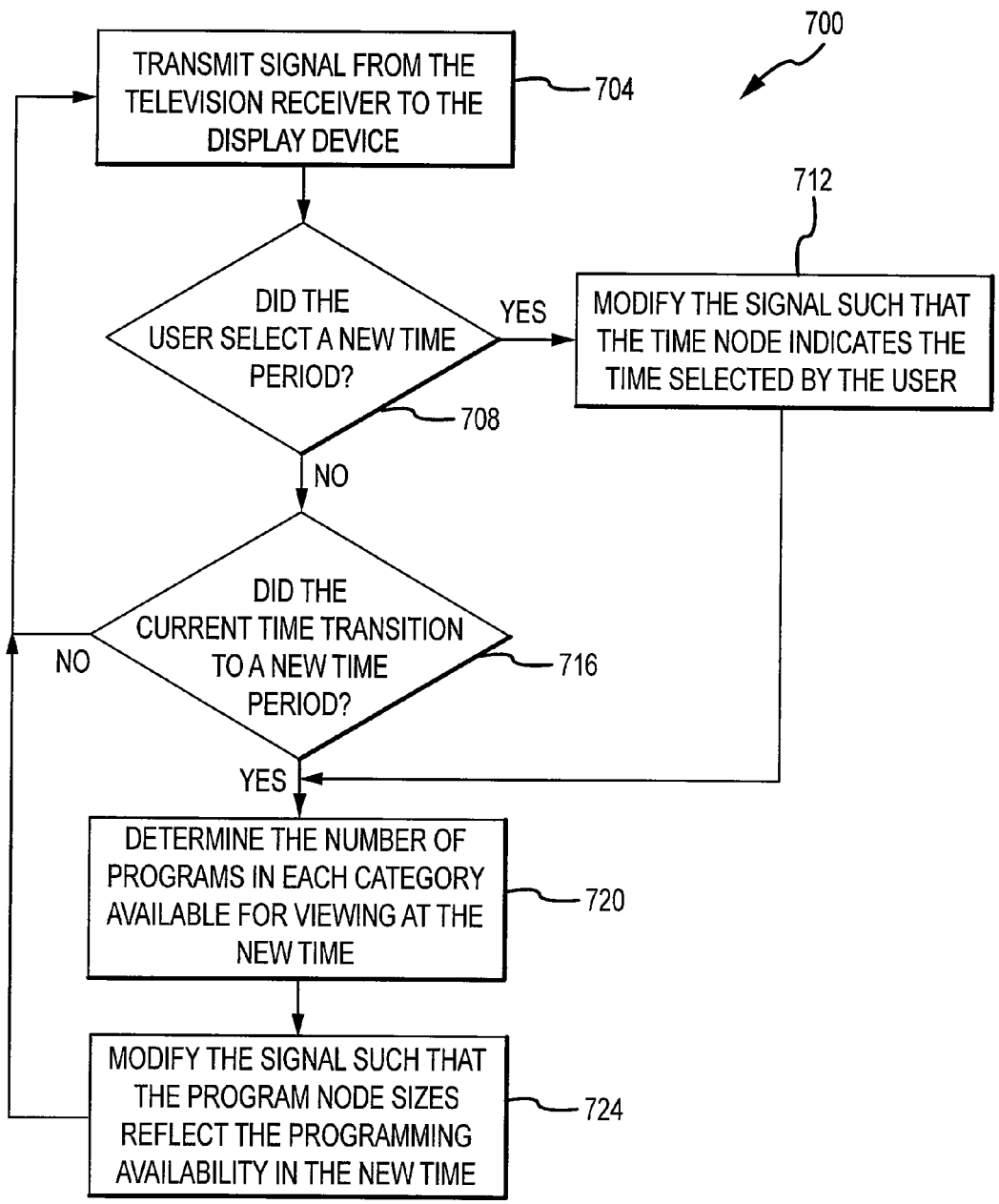
FIG. 7 is another flow chart that illustrates a method executed by the television receiver illustrated in FIG. 1.

FIG. 7 is a flowchart illustrating a method in accordance with embodiments discussed herein. The flowchart 700 is an illustration of operations of the display module 160 that operate to update or modify an EPG content tree to reflect the passage of time or time periods selected by a user. Initially, in operation 704, the display module 160 transmits a signal to the display device 140 that maintains a display of an EPG content tree on the output device 140, such as shown in FIG. 2. Following operation 704, operation 708 may be executed.

In operation 708, the display module 160 determines whether a user has selected a new time period. By way of commands entered into the user input device 144, the user may enter a time of day for which the user wishes to view a visual depiction of available programming. For example, the user may wish to view a visual depiction of programming available at 3:00 p.m. If in operation 708, the user has not entered such a selection, operation 716 may be executed.

In operation 716, the display module 160 may determine if a transition has occurred from a first time period to a second time period. For example, as an EPG content tree is displayed, time may pass such that the currently available programming content changes. This may occur, for example, at the top of the hour where some programs typically end and other programs begin. If, in operation 716, the display module 160 determines that a new time period has begun, operation 720 may be executed. If, in operation 716, no new time period is encountered, operation 704 may be executed following operation 716 such that the signal displaying the EPG content tree may continue to be transmitted from the receiver 108.

If the user has selected a new time period or if the current time has transitioned to a new time period, the displayed EPG content tree may be updated to reflect changes. Referring again to operation 708, if, in this operation, a new time period has been entered, operation 712 may then be executed. In operation 712, the display module 160 may update the displayed time node. Specifically, the display module 160 may modify the signal output from the television receiver 108 such that the displayed time node shows the time indicated by the user's time selection input. Following operation 712, operation 720 may be executed.

In operation 720, the display module 160 may determine the number of programs available for viewing in each of the appropriate program categories for the new time period. Operation 720 may follow from either operation 716 or operation 712. Accordingly, as used herein, the "new time period" may be the current time after a transition between time periods. Alternatively, the "new time period" may be a time period selected by the user in connection with viewing programming content available at a future time. Following operation 720, operation 724 may be executed.

In operation 724, the display module 160 may modify the signal output from the receiver 108 such that the programming nodes are adjusted in size to reflect the proportion of programming content in the various categories and available at the time indicated by the displayed time node. Following operation 720, operation 704 may again be executed such that the signal is continually output from the receiver 108 in order to display the EPG content tree.

Figure 8:
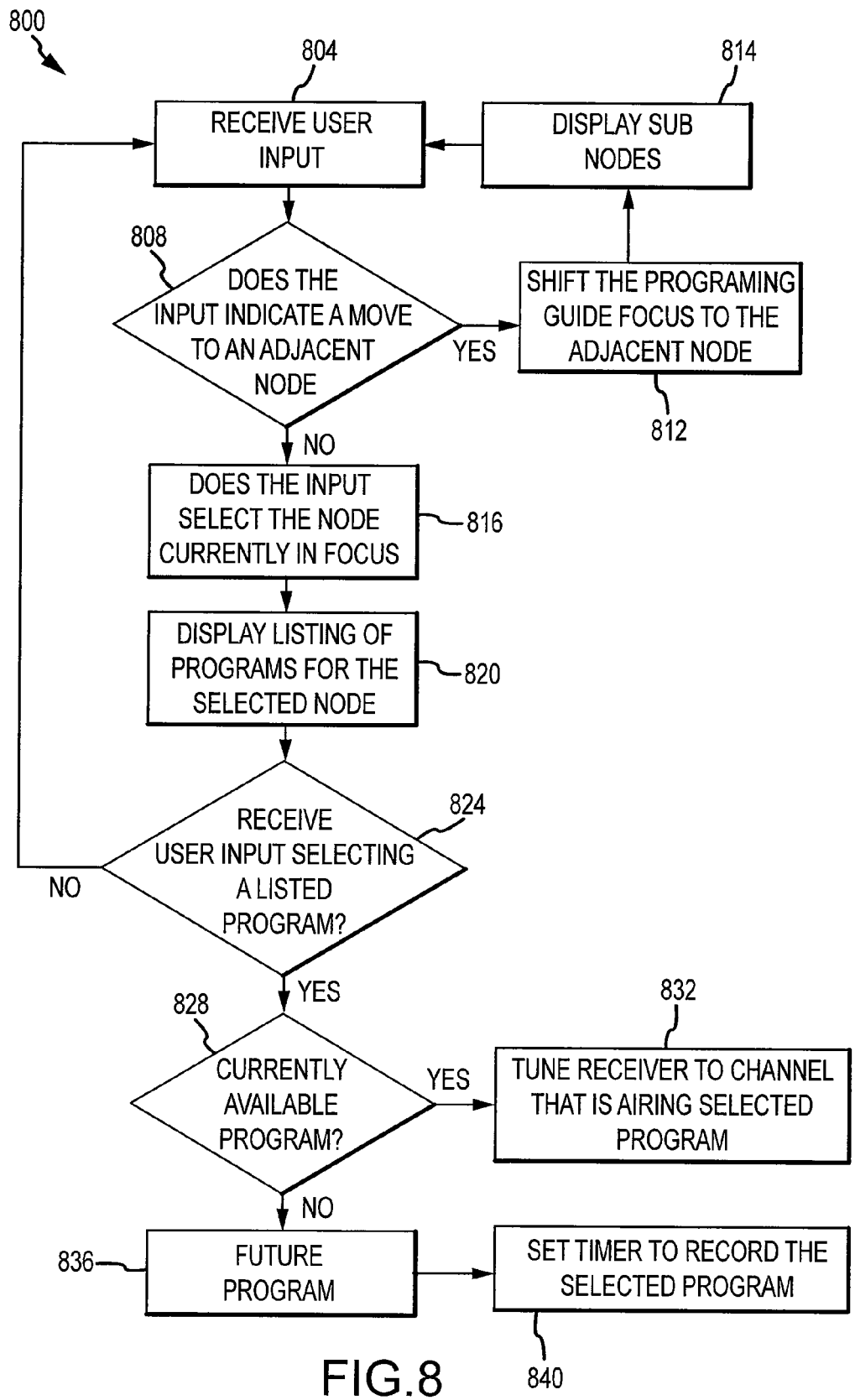
FIG. 8 is another flow chart that illustrates a method executed by the television receiver illustrated in FIG. 1.

FIG. 8 is a flowchart illustrating a method in accordance with embodiments discussed herein. The flowchart in FIG. 8 illustrates a method of navigating through a displayed EPG content tree in response to user input. Initially, in operation 804, the display module 168 processes input from the user that indicates a manipulation or movement through the EPG content tree. The input received in operation 804 may include directional input that selects a node that is adjacent to a node that is in focus. Alternatively, the user input received in operation 804 may be a selection of a particular node. Following operation 804, operation 808 may be executed.

In operation 808, the display module 160 may determine whether the user input indicates a movement to an adjacent node. Such input may include directional commands such as "up," "down," "left," "right," and so on. Such directional input may be given through appropriate commands entered through the input device 144. If, in operation 808, the display module determines that the user input does indicate movement to an adjacent node, operation 812 may be executed.

In operation 812, the display module 160 may shift the focus of the displayed EPG content tree to bring into focus the adjacent node that is indicated by the user's directional input. Shifting the focus of the displayed EPG content tree may include moving the adjacent node into a substantially central location on the output device 140. In addition to moving to a central location, the user-selected node may be highlighted with a particular color, outline or pattern such that the user's attention to drawn to the node. Following operation 812, operation 814 may be executed.

In operation 814, the display module 160 may display any sub-nodes that are associated with the node that is the focus of the displayed EPG content tree. If node on which the focus is placed is a program node, each sub-node may include a sub-category associated with the category shown by the program node. As shown in the sample EPG content tree in FIG. 4, the sub-nodes may represent a further division of the categorization indicated by the program node to which the sub-nodes are connected. Following operation 814, operation 804 may again be executed such that the display module 160 continues to process user input.

If, in operation 808, the user input is determined not to select an adjacent node, operation 816 may be executed. In operation 816, the display module 160 may determine that the input indicates a selection of the node that is currently in focus. Such an input may be entered by the user by pressing a select, enter or other appropriate button on the user input device 144. Following operation 816, operation 820 may be executed.

In operation 820, the display module 160 may modify the signal output from the receiver 108 such that the output device displays a listing of programs. The listing of programs, such as shown in FIG. 5, may include those programs associated with the program node that was selected. Following operation 820, operation 824 may be executed.

In operation 824, the display module 160 may process user input to maneuver through the listing of programs and/or input that selects a particular one of the listed programs. Following operation 824, operation 828 may be executed. In operation 828, the display module 160 may processes the user's channel selection or program selection entered in operation 824. If, in operation 828, the user's selection is determined to be a currently available program, the display module 160 causes the tuner 124 to switch to the channel that carries the selected program in operation 832. If, in operation 836, the user's selection is determined to be a future program, the display module 160 causes the recorder 136 to set a recording timer for the future program in operation 832.

While embodiments are discussed herein in connection with a exemplary satellite or cable broadcast system, it should be appreciated that embodiments may be used in connection other types of networks or content delivery mechanisms. Generally, the disclosure includes content delivered from a provider to a receiver across or over a network. The network across which content may be delivered may include satellite or cable system. Alternatively, the network may include a local area network, wide area network or the Internet. In connection with certain embodiments, a receiver may include a general purpose computer operable to receive data or other content across a network, such as a wide area network of the internet. In such embodiments, the computer may be configured so that a provider can access a web site, a file transfer protocol (FTP) site, a file sharing system or site, and so on. Moreover, the order of method operations, such those shown in FIGS. 6-8, described herein is by way of example and limitation. Certain implementations may reorder method operations without departing from the spirit and scope of the disclosure.

The invention claimed is:

1. An electronic programming guide method, comprising:
   outputting a first signal from a television receiver to an output device, the television receiver receiving a program service transmission from a service provider;
   the first signal causing the output device to display an electronic programming guide tree having nodes including a time node, content nodes, and linked nodes, a first content node connected to one or more first linked nodes that are program nodes,
   receiving a directional input at the television receiver, the directional input indicating a particular one of the one or more first linked nodes; and
   in response to the directional input, outputting a second signal from the television receiver to the output device,
   the second signal causing the output device to display a second content node, the second content node connected to one or more second linked nodes including the first content node, the second content node being a particular one of the one or more first linked nodes indicated by the directional input as a first category of programs available for viewing,
   each one of the program nodes having a size proportional to a number of programs in a first category, the size being independent of user input.

2. The method of claim 1, further comprising:
   placing a visual focus on the first content node by orienting the first content node in a substantially central location on the output device.

3. The method of claim 2, further comprising:
   receiving a node-selection input at the television receiver, the node-selection input indicating a selection of a node that is currently in the visual focus; and
   in response to the node-selection input, modifying a third signal such that a list of all programs in the first category of programs is displayed.

4. The method of claim 3, further comprising:
   modifying the third signal such that the visual focus shifts from the program node to a first program in the list of all programs in a category of programs;
   modifying the third signal such that the program node is displayed in a peripheral location on the output device; and
   modifying the third signal such that none of the other nodes in the electronic programming guide tree are displayed on the output device.

5. The method of claim 4, further comprising:
   modifying the third signal such that the output device displays an extended information window, the extended information window including information for the first program.

6. The method of claim 4, further comprising:
   receiving a program-selection input at the television receiver; and
   in response to the program-selection input, tuning the television receiver to a channel that carries the first program.

7. The method of claim 1, further comprising:
   placing a visual focus on the first content node by highlighting the first content node with a color that contrasts with other colors that are displayed by the output device.

8. The method of claim 1, further comprising:
   a plurality of program sub-nodes, each program sub-node connected to the second content node;
   receiving a second directional input at the television receiver, the second directional input indicating a first program sub-node, the first program sub-node indicating a first subcategory of programs available for viewing at a time of day indicated by the time node, the first subcategory of programs being a subset of the programs in the first category of programs; and
   in response to the second directional input, placing in a visual focus the first program sub-node.

9. An electronic programming guide method, comprising:
   outputting a signal from a television receiver to an output device, the television receiver receiving a program service transmission from a service provider;
   the signal causing the output device to display a time node of an electronic programming guide tree, the time node indicating a time of day; and
   the signal causing the output device to display a plurality of program nodes for the electronic programming guide tree, each one of the program nodes connected to the time node, the plurality of program nodes including at least a first program node indicating a first category of programs available for viewing at the time of day indicated by the time node;
   wherein each one of the program nodes has a size that is proportional to a number of programs in the first category, the size being independent of user input.

10. The method of claim 9, wherein if the television receiver has not received a time selection input, the time node indicates the current time of day.

11. The method of claim 9, wherein the time node indicates a current time of day, the method further comprising:
    receiving an indication that the current time of day coincides with an end of a first time period and a beginning of a second time period;
    determining that the number of programs in the first category and available for viewing in the first time period differs from the number of programs in the first category and available for viewing in the second time period; and
    in response, modifying the signal such that the size of the first program node is changed to be proportional to the number of programs that are in the first category and available for viewing in the second time period.

12. The method of claim 9, further comprising:
    receiving a time-selection input at the television receiver, the time-selection input selecting a time of day, the time of day selected by the time-selection input differing from the time of day indicated by the time node; and
    in response to the time-selection input, modifying the signal such that the time node indicates the time of day selected by the time-selection input.

13. The method of claim 12, further comprising:
in response to the time-selection input, modifying the signal such that the size of the first program node is proportional to a number of programs that are in the first category and are available for viewing at the time of day indicated by the time-selection input.

14. The method of claim 12, further comprising:
receiving a node-selection input at the television receiver, the node-selection input selecting the first program node; and
in response to the node-selection input, displaying a list of all programs in the first category of programs.

15. The method of claim 14, further comprising:
receiving a program-selection input at the television receiver; and
in response to the program-selection input, setting a timer at the television receiver to record the program indicated by the program selection input.

16. A television receiver, comprising:
a tuner operable to receive a program service transmission from a service provider, the program service transmission having a plurality of channels, the tuner operable to select one of the plurality of channels and to process the selected channel to be output in a video signal to an output device;
a memory connected to the tuner, the memory having a tangible storage medium operable to store computer readable instructions and data including electronic programming guide data received from the service provider;
a processor connected to the memory and operable to run computer executable code stored in the memory;
a display module including a memory having computer readable instructions stored therein, the instructions causing the processor to process the electronic programming guide data and to output at least a portion of the electronic programming guide data in a data signal to the output device, the data signal causing the output device to display an electronic programming guide tree having at least a time node and a first program node connected to the time node; and
the first program node indicating a programming category, the first program node having a size proportional to a number of programs that belong to the programming category and that are available for viewing at a time of day indicated by the time node, the size being independent of user input.

17. The television receiver of claim 16, further comprising a signal receiver that receives commands from a user input device, the commands including:
a directional command instructing the display module to shift a focus of the electronic programming guide tree from a first node that is currently the focus of the electronic programming guide tree to a second node that is adjacent to the first node;
a node-selection command instructing the display module to display programs that are associated with a node that is currently the focus of the electronic programming guide tree; and
a program-selection command instructing the tuner to select and process a channel that carries a program that is currently the focus of the electronic programming guide tree.

18. The television receiver of claim 17, wherein the commands additionally include a time-selection command instructing the display module to output an electronic programming guide tree for a time period indicated by the time-selection command, the television receiver further comprising:
a recorder that records and stores programs received by the tuner from the service provider;
wherein if the display module outputs an electronic programming guide tree for a future time, the program-selection command causes the recorder to set a timer to record the program that is currently the focus of the electronic programming guide tree.

\* \* \* \* \*